June 4, 1935. M. E. HALFORD 2,003,884
CONTROL VALVE FOR AUTOMATIC SPRINKLER SYSTEMS
Filed Feb. 2, 1933

Inventor
M. E. HALFORD
By Mason Fenwick & Lawrence
Attorneys

Patented June 4, 1935

2,003,884

UNITED STATES PATENT OFFICE 2,003,884

CONTROL VALVE FOR AUTOMATIC SPRINKLER SYSTEMS

Marion Eugene Halford, Greensboro, N. C.

Application February 2, 1933, Serial No. 654,956

2 Claims. (Cl. 169—17)

This invention relates to control valves for automatic sprinkler systems, and more particularly to an improved alarm valve adapted to maintain either water or air on a system of distributing pipes, with continuous automatic control of the alarm device through all phases of its operation.

The principal objects of the invention are to provide means in a variable pressure alarm valve which will establish a differential of pressures when it is desired to maintain air, instead of the usual water, on the system of distributing pipes; and, to provide means for automatically eliminating the differential of pressures when the variable pressure alarm valve is converted from a dry system back to a wet system valve; and further to provide a construction whereby the alarm device usually associated with such systems will be automatically controlled through all phases of operation of the alarm valve as either a wet pipe or dry pipe system.

The invention consists in the novel construction, arrangement and combination of parts hereinafter more particularly described and claimed.

Figure 1:
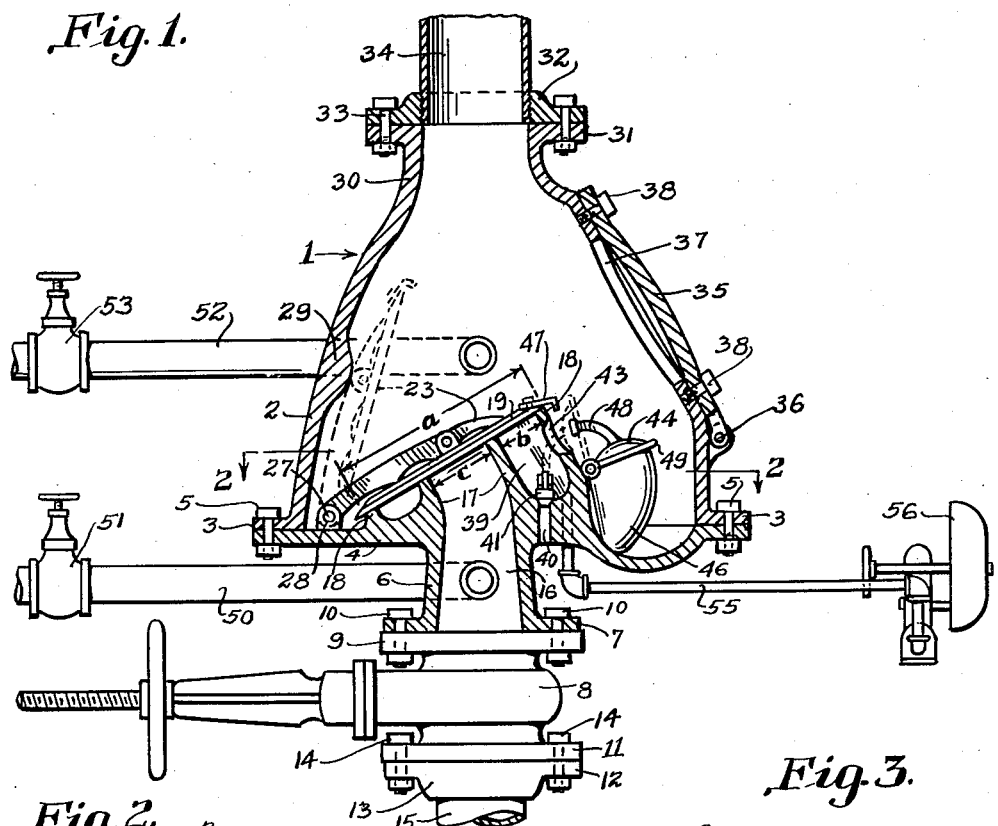
Figure 1 is a vertical cross section through the improved alarm valve showing the water driven alarm device diagrammatically.
Figure 2:
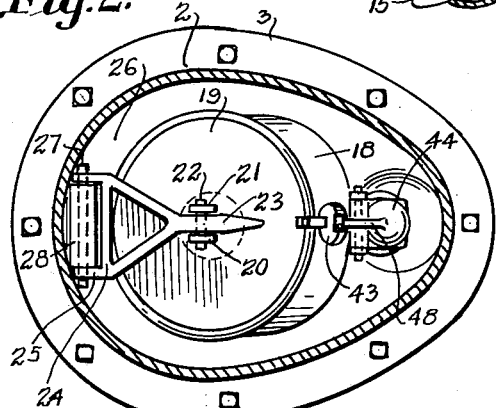
Figure 2 is a horizontal cross section taken on the line 2—2 of Figure 1, showing the main clapper valve in seated position.
Figure 3:
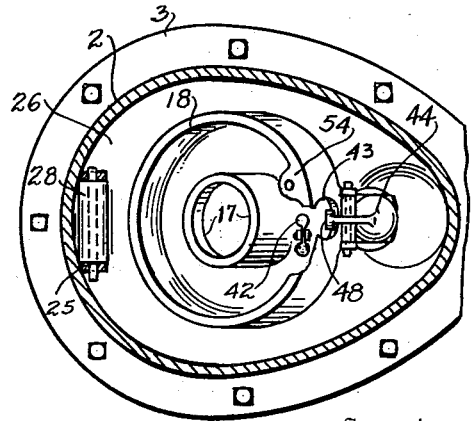
Figure 3 is a horizontal cross section, similar to Figure 2, but showing the clapper valve removed, part of the valve mechanism being broken away to show details of construction.

Heretofore, alarm valves have been designed to maintain only water on a system of distributing pipes, it being understood before its installation that the building would be heated during freezing weather and protect the sprinkler pipes from freezing. This type of system, known as a "wet pipe system", is highly desirable because the water to be used for fire extinguishing purposes is always in the distributing pipes directly over the origin of the fire.

However, when buildings protected with this type of sprinkler system become vacant and heat is no longer maintained during cold weather, it is then necessary to replace the wet pipe valve with a dry pipe valve, or shut off the system and drain the pipes thereof to prevent freezing. From a fire protection standpoint the latter action is very undesirable; the former necessity is costly and generally not done. It would obviously, therefore, be desirable to have an alarm valve designed to maintain air pressure in the distributing pipes instead of water, under the foregoing circumstances, preceding the operation of one of the sprinklers.

Previously it has been customary in variable pressure alarm valves to have a check valve of the "flapper type" arranged to rest in its normal position on one valve seat. In the preferred form of my wet pipe alarm valve a check valve is arranged to seat in its normal position on two concentric seats. Since it is usual to maintain air on a system of sprinkler pipes by differential means, the differential control mechanism is associated with the outer of the concentric seats and controls the transmission of pressure through a passage in the outer seat flange; the novelty of construction of which will be readily understood by referring to the drawing.

The invention comprises a casing 1 formed as a casting having its lower part 2 elliptical in shape and provided with an outwardly extending flange 3. A valve supporting base 4 is detachably secured to the flange 3 by suitable bolts 5.

The base 4 has formed thereon a downwardly extending centrally bored projection 6, terminating in a flange 7, to which a main control valve 8 is detachably secured by its flange 9 and bolts 10. To the other flange 11 of control valve 8, a flange 12 of a fitting 13 is detachably secured to flange 11 by bolts as at 14. The fitting 13 is internally screwthreaded to receive the externally screwthreaded end of a supply conduit 15.

The bore 16 of the projection 6 is continued upwardly of the base 4 and into the casing 1 by means of the flange 17. This flange 17 is concentric with an outer flange 18 formed on the base 4 and both flanges have their edges co-planar to form seats for a single "flapper valve" 19. The valve 19 is provided on its back with a pair of lugs 20 and 21 provided with apertures to receive a pivot 22 passing through an aperture suitably formed in a supporting arm 23. The arm 23 is expanded at its rear end to form a frame 24 having lugs 25 and 26 bored to receive a pivot rod 27 passing through a suitably formed bearing aperture in standard 28 projecting upwardly from the inner face of the base plate 4.

The flanges 17 and 18 form valve seats for the "flapper valve" 19, and the parts are so designed that the valve 19 is properly seated by gravity when in the position shown in Figure 1. The casing 1 is provided on its inner surface with a projection 29 to form a stop adapted to contact with the back of arm 23, and limit the upward swing of valve 19 so as to insure the tendency of said valve to move normally by gravity toward its flange seats 17 and 18.

The upper end of the casing 1 terminates in a cylindrical part 30 having a flange 31 adapted to have a fitting 32 secured thereto by means of the bolts 33. The fitting 32 is internally screwthreaded to receive the externally screwthreaded end of a distributor conduit 34.

The front part of casing 1 is flattened to form a seat for a door 35 which is hinged at its lower end on a pivot 36. The casing is provided with a door opening 37 and headed machine screws 38 are used to clamp the door 35 securely against its seat. While only two of these screws 38 are shown in the drawing, it will be understood that a sufficient number will be used to insure a water and air tight fit of the door against its seat.

Figure 4:
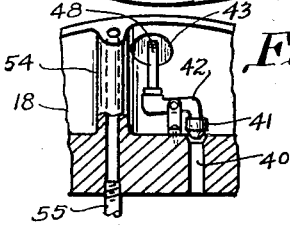
Figure 4 is a fragmentary detail illustrating a means for operating a valve forming part of this invention.

The chamber 39 formed between the flanges 17 and 18 is provided at its base with a pressure release comprising: an outlet 40 in the base plate 4 shaped to form a valve seat for a gravity valve 41, of the usual type, which is carried by a fulcrumed arm or lever 42 (see Figure 4). An opening 43 formed through the flange 18, provides communication from the casing interior and the chamber 39, and is adapted on its outer side to seat a valve 44 pivotally mounted to a recessed portion of the base plate 4; and, due to its weight 46 is held against the base plate 4 by gravity during the normal operation of the alarm valve as a wet pipe system. A latch 47 carried by the valve 19 at its ultimate radius is arranged to hold the valve 44 over opening 43 when the valve 44 is manually rotated and seated over opening 43, and when valve 19 is in the position shown by solid lines in Figure 1. A finger 48 projecting forward and curved downward from the face of valve 44 is adapted to exert pressure downward on the lever arm 42 carrying valve 41, and raises this valve 41 when valve 44 is seated to close opening 43, thereby allowing all water pressure in chamber 39 to be discharged outside of the casing 1 through outlet 40.

In setting the valve 44 to close the opening 43, the operator must open the door 35 and manually rotate valve 44 into position over opening 43, slightly raising valve 19 to allow the valve 44 to pass under the latch 47; the reseating of valve 19 will then engage latch 47 behind a projection 49 on the valve 44 and restrain the said valve from rotating due to gravitational action on its weighted part.

The bore 16 is provided with a drain pipe 50 controlled by a valve 51. The casing 1 has a drain pipe 52, controlled by a valve 53, located at such a point that water will be drained from the casing at least to the lowest point of the opening 37.

The inner side of the flange 18 is provided with a boss 54 bored to receive a pipe 55, which bore and pipe communicate with the water motor alarm 56; the opening in boss 54 being coplanar with the valve seat formed by flange 18, and adapted to be closed by flapper valve 19 when same is seated. Any unseating of valve 19 will allow water within the casing to be discharged through piping 55, and subsequent reseating of valve 19 will automatically stop the discharge to the alarm.

The area represented by "a" is the total area of the clapper 19 exposed to downward pressure; the area represented by "b", on the clapper 19, is that portion of the clapper over the chamber 39, and is normally subjected to upward water pressure; and the area represented by "c" is that portion of clapper 19 always exposed to upward water pressure.

The operation and utility of my invention may be readily disclosed by the following description of a complete cycle of operation of the alarm valve:

Assume that this valve is inserted in the supply main to a sprinkler system, and, since the building is to be heated during freezing weather, water is to be maintained constantly on the distributor pipes. With the parts of the device in position, as shown by solid lines in Figure 1, an initial opening of the gate valve 8 will allow water to enter the alarm valve and distributing pipes and equalize. Pressure exerted downward over area "a", on clapper 19, will be equal to the upward pressures exerted on clapper 19 over areas "b" and "c". It will be noted that part of area "a" corresponding to area "b", (or that portion of area "a" over the chamber 39) will always have the opposing pressures equalized when the system is "wet" due to the transmission of pressure through the opening 43 in the flange 18. The fusing of a sprinkler head in the distributing pipes will reduce the pressure on the distributor side of clapper 19 and the greater upward pressure on the supply side of the clapper, over area "c", will raise it and allow water to flow to the distributor pipes and be discharged; the raising of clapper 19 from over the outlet in boss 54 will also allow water to be discharged from the casing to piping 55 and the water motor alarm 56, thereby giving an alarm.

Upon water ceasing to flow from the distributor pipes, due to the fused sprinkler being replaced, and water pressure in the system equalizes again, the clapper 19 will automatically gravitate to its seat, due to its own weight and its off-center position caused by stop 29, and in so doing close outlet 55 in boss 54, automatically stopping the alarm.

Now, should the building be vacated and heat no longer maintained during cold weather to prevent the pipes from freezing, it would be highly desirable to have the apparatus operate as a dry sprinkler system. Then, the control valve 8 is closed, thereby removing hydrostatic pressure from the system, and all water is drained from the distributor pipes by means of drain valves 51 and 53. The cover plate 35 is then removed to gain access to the working parts. The valve 44 is rotated to seat over opening 43, clapper 19 being slightly raised in order that valve 44 will pass latch 47. The valve 19 is then reseated and latch 47 carried by valve 19 is allowed to hold valve 44 over opening 43 by engaging behind a projection 49 on valve 44. The initial seating of valve 44 over opening 43 will cause the finger 48 to exert pressure downward on the lever 42 in chamber 39, carrying on its opposite end the valve 41, and thereby cause said ball valve 41 to be raised from over outlet 40, allowing water contained in chamber 39 to be discharged to the outside of the casing. The chamber 39 and area "b" of clapper 19 will then be exposed only to atmospheric pressure.

Enough water is provided in the casing to barely cover all working parts, known as "priming water", and acts as a water seal around the two valves 19 and 44. The cover plate 35 is replaced and a relatively low, predetermined, air pressure compressed into the distributor pipes; and, subsequently, air pressure is exerted downward on the clapper 19 over area "*a*". Gate valve 8 is then opened and water pressure exerted upward over area "*c*". Since area "*b*" is subject to atmospheric pressure only, a differential of pressures is formed, and the total water pressure upward over area "*c*" is held back by the total air pressure downward over area "*a*".

The operation, then, of a sprinkler head in the distributing pipes will reduce the air pressure, finally, to a "tripping point" when the water pressure will overcome the reduced air pressure and clapper 19 will be automatically raised, allowing water to pass to the distributor pipes and be discharged from the fused sprinkler. The raising of clapper 19 will also allow valve 44 to be released by the latch 47, and automatically gravitate and open the passage 43, thereby eliminating the differential previously formed since the same pressure in the casing will be transmitted to the chamber 39 and upward pressure exerted again on the clapper 19 over area "*b*", when it reseats. The gravitational action of valve 44 will remove the pressure of finger 48 from the lever arm carrying valve 42, and due to gravity, the valve 41 will close the outlet 40, preventing any unnecessary loss of pressure.

The automatic unseating of clapper 19, when the sprinkler head fuses, will also allow water to be discharged through the outlet in boss 54 to the piping 55 and ultimately to the water motor alarm 56, giving an alarm. When water ceases to flow through the alarm valve and water pressure equalizes throughout the system, the clapper 19 will gravitate back to its seats 17 and 18 and close the outlet to the alarm device, thereby, automatically stopping said alarm. Since the passage 43 remains open by virtue of the previous unseating of valve 44, pressure is allowed to equalize on both sides of valve 19 and the alarm valve automatically operates further as a wet system valve, until again it is desired that air, instead of the usual water, be maintained in the distributor pipes and the differential control mechanism is manually reset.

It is a generally known fact, in air retaining devices that the outlet to the alarm is not automatically controlled. The main clapper or clappers are usually locked open after the "tripping point" is reached, and in these previous devices this is necessary, since automatic reseating of the clappers after water ceases to flow, and the system equalizes, would result in "water columning" due to the differential design. However, it will be noted in my invention that since the differential of pressures is eliminated simultaneously with the tripping of the dry valve mechanism, then, it is entirely practicable for the main clapper to be arranged to gravitate back to its seat upon water ceasing to flow. By virtue of the differential control, and the gravitational action of clapper 19, the outlet in boss 54 leading to the water motor alarm is automatically controlled. An alarm will, then, be given when there is a flow of water in the system whether the system is operating as a wet pipe or a dry pipe system.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A combined wet-dry pipe sprinkler system control valve comprising a casing having supply and distributor conduits extending therefrom, the supply conduit extending within the casing as an annular flange, a second annular flange surrounding and spaced from the first and forming therewith an annular chamber, said flanges having coplanar upper edges, a flapper valve pivoted in such a manner as to gravitate to seat on both of said flanges, conduits affording communication between said annular chamber and the interior of the casing and between said chamber and the exterior of the casing and valves controlling said conduits, said valves arranged to interact so that when the one controlling the former conduit is closed it will hold the one controlling the latter conduit open and conversely the valve in the conduit to the exterior will be closed when the valve to the conduit to the interior is open, whereby said annular chamber communicates selectively with the interior or exterior of the casing and the pressure therein is atmospheric or that of the interior of the casing as said valves are set, means for engaging the flapper valve with the first mentioned of said conduit valves to hold same seated as long as the flapper valve is seated and means for opening said conduit valve when the flapper valve is open.

2. The structure of claim 1 in which the valve controlling the conduit between the annular chamber and the interior of the casing is weighted and arranged to gravitate to open position when the flapper valve is unseated.

MARION EUGENE HALFORD.